US010826661B2

(12) United States Patent
Miao et al.

(10) Patent No.: US 10,826,661 B2
(45) Date of Patent: Nov. 3, 2020

(54) ENHANCED SOUNDING REFERENCE SIGNALING FOR UPLINK BEAM TRACKING

(71) Applicant: Appple Inc., Cupertino, CA (US)

(72) Inventors: Honglei Miao, Munich (DE); Hyejung Jung, Palatine, IL (US); Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/743,094

(22) PCT Filed: Dec. 21, 2015

(86) PCT No.: PCT/US2015/067014
§ 371 (c)(1),
(2) Date: Jan. 9, 2018

(87) PCT Pub. No.: WO2017/027055
PCT Pub. Date: Feb. 16, 2017

(65) Prior Publication Data
US 2019/0081751 A1 Mar. 14, 2019

Related U.S. Application Data

(60) Provisional application No. 62/203,300, filed on Aug. 10, 2015.

(51) Int. Cl.
H04L 5/00 (2006.01)
H04W 72/04 (2009.01)
(Continued)

(52) U.S. Cl.
CPC ......... H04L 5/0048 (2013.01); H04B 7/0404 (2013.01); H04B 7/0617 (2013.01);
(Continued)

(58) Field of Classification Search
CPC . H04L 5/0048; H04L 1/0003; H04L 25/0224; H04B 7/0617; H04B 7/0404;
(Continued)

(56) References Cited

U.S. PATENT DOCUMENTS

2010/0103902 A1 4/2010 Kim et al.
2011/0249581 A1* 10/2011 Jen .................. H04L 5/0035
370/252

(Continued)

FOREIGN PATENT DOCUMENTS

CN 102215580 10/2011
CN 103299694 9/2013
(Continued)

OTHER PUBLICATIONS

International Search Report and Written Opinion received for International Application No. PCT/US2015/067014, dated Jun. 29, 2016, 14 pages.

(Continued)

Primary Examiner — Jae Y Lee
Assistant Examiner — Jean F Voltaire
(74) Attorney, Agent, or Firm — Kilpatrick Townsend & Stockton LLP

(57) ABSTRACT

Apparatus, systems, and methods to implement enhanced sounding reference signaling for uplink (UL) beam tracking in communication systems are described. In one example, an apparatus of an evolved Node B (eNB) comprising processing circuitry to broadcast system information about one or more sets of uplink transmit time intervals and bandwidths available for a sounding reference signal (SRS) transmission from a first user equipment (UE), configure one or more UE-specific SRS processes for the first UE for uplink beam tracking, and configure one or more millimeter wave access points (mmW APs) to transmit a mmW signal to the first UE and receive a mmW signal from the first UE. Other examples are also disclosed and claimed.

25 Claims, 10 Drawing Sheets

(51) Int. Cl.
*H04B 7/0404* (2017.01)
*H04B 7/06* (2006.01)
*H04L 1/00* (2006.01)
*H04L 25/02* (2006.01)
*H04W 80/02* (2009.01)
*H04W 80/08* (2009.01)

(52) U.S. Cl.
CPC ......... *H04B 7/0619* (2013.01); *H04B 7/0628* (2013.01); *H04L 1/0003* (2013.01); *H04L 25/0224* (2013.01); *H04W 72/0406* (2013.01); *H04W 72/0446* (2013.01); *H04L 5/0023* (2013.01); *H04L 5/0051* (2013.01); *H04W 80/02* (2013.01); *H04W 80/08* (2013.01)

(58) Field of Classification Search
CPC ............ H04B 7/0628; H04W 72/0446; H04W 72/0406; H04W 80/02
USPC .......................................................... 370/329
See application file for complete search history.

(56) References Cited

U.S. PATENT DOCUMENTS

| | | | | |
|---|---|---|---|---|
| 2012/0320874 | A1* | 12/2012 | Li | ........................ H04W 48/12 370/331 |
| 2014/0071909 | A1 | 3/2014 | Frenne et al. | |
| 2015/0334705 | A1* | 11/2015 | Zhao | ..................... H04W 36/22 370/329 |
| 2016/0095108 | A1* | 3/2016 | Ryoo | ................ H04W 72/0426 370/329 |

FOREIGN PATENT DOCUMENTS

| | | | | |
|---|---|---|---|---|
| CN | 103765792 | | 4/2014 | |
| CN | 107852199 | A | 3/2018 | |
| KR | 2008-0112115 | A | 12/2008 | |
| TW | 201717692 | A | 5/2017 | |
| WO | 2012/064783 | A2 | 5/2012 | |
| WO | 2012064783 | | 5/2012 | |
| WO | WO-2012064743 | A2 * | 5/2012 | ........... A61N 1/3682 |
| WO | 2014101801 | | 7/2014 | |
| WO | 2017/027055 | A1 | 2/2017 | |

OTHER PUBLICATIONS

Notification of Publication of the Request to Record, Hong Kong Application No. 1251997A, Publication Date May 10, 2019, letter dated Apr. 12, 2019.
China Patent Application No. CN201580081712.3, Office Action, dated Jul. 15, 2020, 10 pages. English translation not included.
Taiwan Patent Application No. TW105121244, Office Action, dated Jul. 30, 2020, 8 pages. English translation not included.

* cited by examiner

ENHANCED SOUNDING REFERENCE SIGNALING FOR UPLINK BEAM TRACKING

RELATED APPLICATIONS

This application claims the benefit of priority under 35 U.S.C. § 371 to International Application No. PCT/US2015/067014 filed Dec. 21, 2015, entitled ENHANCED SOUNDING REFERENCE SIGNALING FOR UPLINK BEAM TRACKING which in turn claims benefit of priority under 35 U.S.C. § 119(e) of U.S. Provisional Application Ser. No. 62/203,300 filed Aug. 10, 2015, 2015, entitled ENHANCED UE SOUNDING REFERENCE SIGNALING FOR UPLINK BEAM TRACKING AND DATA SCHEDULING IN 5G RAT BEAM CELL OPERATION, the disclosures of which are incorporated herein by reference in their entirety.

FIELD

The present disclosure generally relates to the field of electronic communication. More particularly, aspects generally relate to enhanced sounding reference signaling for uplink (UL) beam tracking in communication systems.

BACKGROUND

Techniques to enable enhanced sounding reference signaling for uplink beam tracking may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

Figure 1:
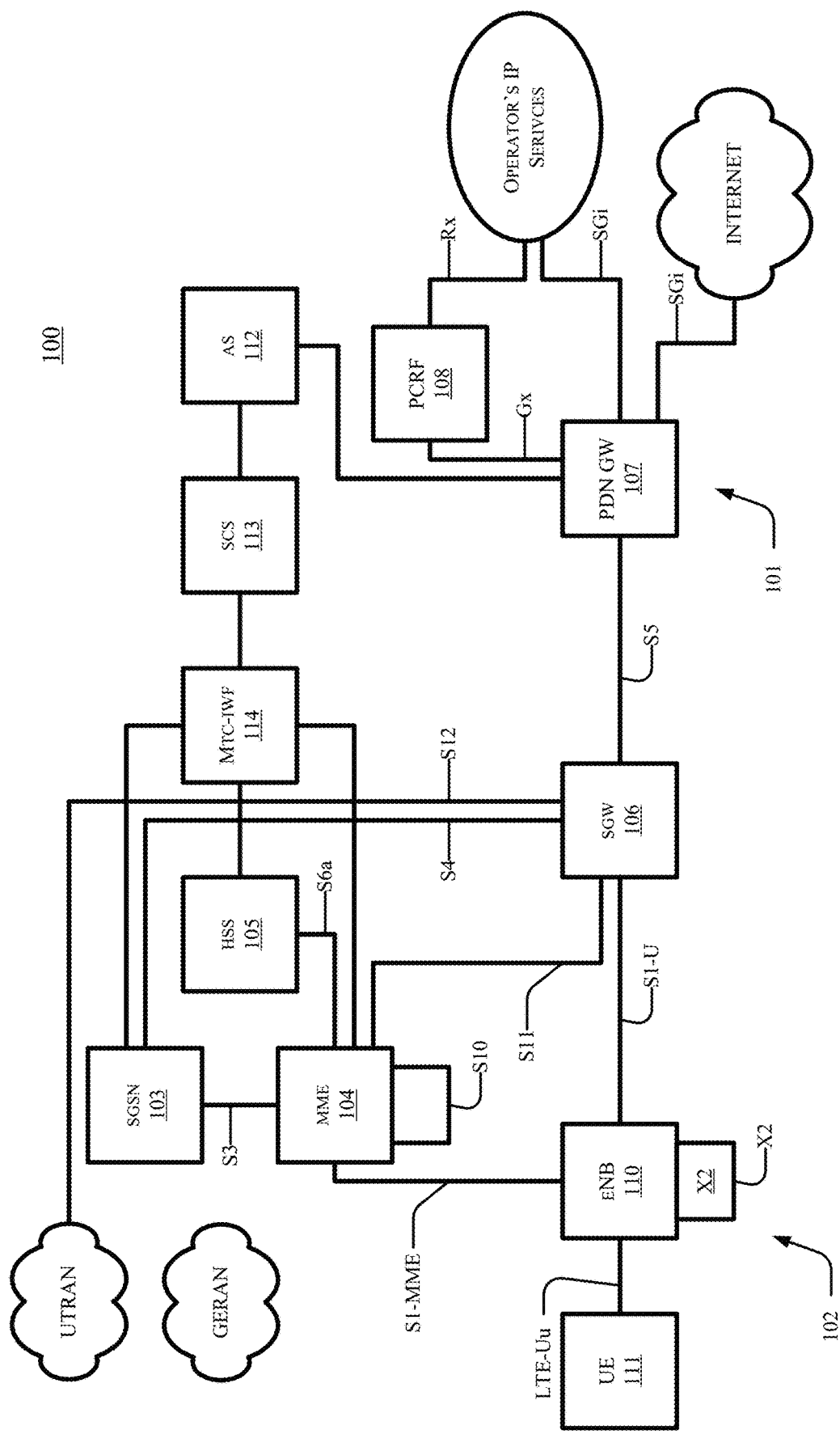
FIG. 1 is a schematic, block diagram illustration of components in a 3GPP LTE network which may be used to implement techniques for enhanced sounding reference signaling for uplink beam tracking in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

In 5G radio access technology (RAT), which may be operated in both current cellular bands and frequency bands above 6 GHz, narrow beam based system operation exploiting advanced MIMO (e.g. massive MIMO) and Cooperative Multi-point (CoMP) transmission and reception schemes are expected to be important technology components to achieve high area traffic capacity and a consistent user experience. For millimeter-wave (mmWave) bands, beamforming at both the eNodeB (eNB) and the user equipment (UE) is used to compensate for pathloss inherent in mmWave bands. Additionally, UE transmit beamforming may be beneficial to power limited cell-edge UEs in low-to-mid frequency bands, e.g. 3.5 GHz, 15 GHz, and 28 GHz.

Typically a beamforming operation utilizes channel state information such as spatial channel information, e.g., angle of arrival or angle of departure of perceived multipath components at the both ends of the link, Both the eNB and the UE should transmit/receive their signals towards respective optimal direction in an effort to reduce propagation attenuation. This is beneficial for link reliability improvement and for energy consumption. In some examples an eNB downlink beamforming alignment can be achieved using an enhanced directional discovery signal or channel state information reference signal (CSI-RS). The initial uplink beam alignment can be realized during the random access (RACH) procedure by enhanced RACH sequence design. Due to the mobility of UEs, the optimal uplink beam direction should follow the movement of UEs.

In LTE, the UE sounding reference signal (SRS) has been designed to enable the eNB to estimate the uplink channel condition of the UE. By virtue of the estimated channel condition, a frequency selective scheduling can be performed. Both periodic and single sounding reference signals are specified in LTE. Moreover, to support uplink MIMO transmission, a dynamic triggered sounding reference signal may be implemented. To cope with the limited transmit power issue, especially when the UE is far from the eNB, the narrow band SRS with frequency hopping can be transmitted by the UE to provide the reasonably accurate channel estimation for the full system bandwidth. The aperiodic SRS in LTE designed for the uplink MIMO transmission is to enable a digital beamforming/precoding operation to support multi-layer transmission. As such, the SRS of each antenna port is typically transmitted in an omnidirectional manner, and is not tailored for the potential uplink analog beamforming.

As described in brief above, techniques to implement enhanced sounding reference signaling for uplink beam tracking may find utility, e.g., in electronic communication systems for electronic devices. Subject matter described herein addresses these and other issues by providing techniques to implement enhanced sounding reference signaling to support the uplink beamforming tracking.

In some examples, a UE specific SRS configuration based on the UE's SRS capability furnishes both long term and short term beam tracking capability. The long term beam tracking may be performed periodically with coarse beam tracking accuracy. The short term beam tracking may be triggered dynamically with finer beam tracking accuracy. Moreover, the uplink data scheduling control information provides optimal uplink beam direction for the data transmission to realize a closed loop uplink beam alignment mechanism. By virtue of the enhanced SRS design, multi-point reception with optimal transmit-receive beam selection and multi-beam UL transmission are supported.

By way of overview, in some examples after a successful connection set-up between a UE and an eNB, the UE may be configured to transmit multiple periodic SRSs. Further, an aperiodic SRS process may be triggered for one or more of the strongest received periodic SRS(s) to enable the eNB to determine an uplink transmit beam direction for the very first uplink data packet to be scheduled. A network entity (e.g., an eNB) measures periodic SRS processes. When the network entity detects a change in a dominant periodic SRS process, the network entity may trigger an aperiodic SRS process for the new strongest periodic SRS process in order to acquire a beam refinement. The condition which triggers the aperiodic SRS process can be similar to radio resource management (RRM) report triggering conditions for potential cell reselection (i.e., handover) procedures. These techniques enable the network to maintain up-to-date information on uplink reception points with preferred uplink Tx-Rx beams for the UE, and can indicate a proper set of Tx beams for PUSCH via uplink downlink control information (DCI).

In some examples, after a UE connects to a network element (e.g., an eNB), an analog beamforming capable UE can signal to the network the maximum number of supported SRS processes, i.e., the maximum number of beams which can be simultaneously transmitted, and the number of SRS instances in a SRS cluster for each SRS process which transmits periodically SRS clusters. The number of SRS instances in a SRS cluster can be defined as the repetition level of SRS instances in the associated SRS process. Each SRS process may correspond to a particular uplink beam sector. The SRS instances can correspond to sub-beam directions within the beam sector associated with the SRS process. The SRS instances in the SRS process can be also transmitted by using the same beam direction with wider beamwidth so that the repetition level of the SRS instances can help to increase the coverage of the SRS process. Whether the SRS instances in the SRS process are transmitted in different sub-beam directions or same wide beam direction, this can be signaled by the UE about the number of supported sequential antenna ports for the SRS process. The SRS instances using different sequential antenna port may imply to use different beam directions, otherwise, the same beam direction for different SRS instances can be assumed. This information may be used by the network element to determine the maximum number of interleaved frequency domain multiple access (IFDMA) SRSs to be configured for the UE and potential multi-beam UL transmission.

Upon receiving the above signaled UE SRS capability, a serving network entity (e.g., an eNB) comprising one or more cooperative access points (APs) can configure multiple periodic SRS processes for the UE. With this configuration, the UE transmits several SRS processes periodically, and each SRS process is transmitted towards different uplink beam sector direction. The multiple periodic SRS processes can be transmitted with time domain multiple access (TDMA) or IFDMA configured by the network depending on the UE analog beamformer capability signaled in the above step.

Based on the average receive power of each SRS process at each AP of the serving network, the serving network may determine or update a subset of APs within the serving network for uplink reception and the subset of APs can determine the strongest uplink beam sector directions. Moreover, the periodic reception of these SRS processes also enables each AP to track the average receive power of the uplink beam sector originating from the UE.

Prior to scheduling an uplink data packet as per UE's request, the serving network may optionally trigger one or several aperiodic SRS processes corresponding to one or several strongest periodic SRS processes. Each aperiodic SRS process induces the UE to send a number of SRS instances, each of which may correspond to a sub-beam direction within the selected uplink beam sector.

After receiving the complete aperiodic SRS process, the eNB can determine the strongest receive SRS instance corresponding to the refined sub-beam direction within the beam sector associated with a periodic SRS process of all the involved APs. The eNB will schedule the uplink data packet with the control information, among others including the preferred SRS instance indices indicating one or several strongest uplink beam directions.

Thus, the methods described herein enable uplink beam alignment for the eNB to schedule the uplink data packet from the UE. The received signal quality of one or more uplink beam sectors (depending on the UE SRS capability) can be monitored by the eNB to configure multiple periodic SRS processes for the UE. Moreover, dynamic aperiodic SRS signaling triggers the UE to transmit a number of SRS instances to enable the eNB to determine a refined uplink beam direction within the strongest uplink beam sector. When the eNB schedules the uplink packet, the eNB signals the preferred uplink beam direction in terms of the SRS instance index or SRS antenna port index in the strongest periodic SRS process to the UE. The UE transmits the uplink packet to the eNB in the preferred beam direction, which increases the uplink reliability, and potentially reduces power consumption. When a number of APs are configured to serve the UE, the uplink CoMP reception as well as multi-beam UL transmission is inherently supported by the proposed method.

Additional features and characteristics these techniques and communication systems in which the techniques may be incorporated are described below with reference to FIGS. 1-11.

FIG. 1 shows an exemplary block diagram of the overall architecture of a 3GPP LTE network 100 that includes one or more devices that are capable of implementing methods for enhanced sounding reference signaling for uplink beam tracking according to the subject matter disclosed herein. FIG. 1 also generally shows exemplary network elements and exemplary standardized interfaces. At a high level, network 100 comprises a core network (CN) 101 (also referred to as an evolved Packet System (EPS)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1A. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 2:
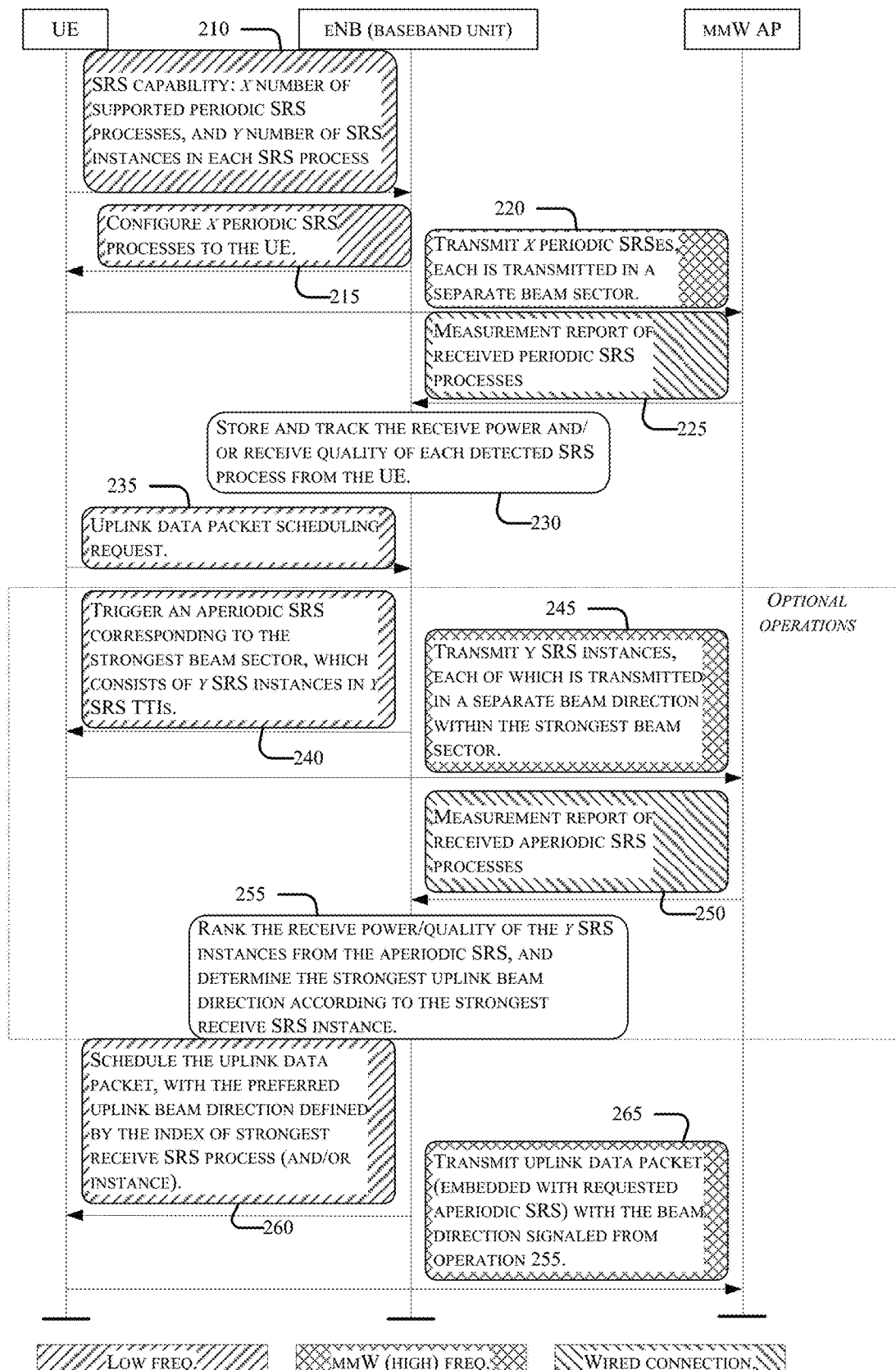
FIG. 2 is a flow diagram illustrating operations in a method to implement enhanced sounding reference signaling for uplink beam tracking in accordance with various examples discussed herein.

FIG. 2 is a flow diagram illustrating operations in a method to enhanced sounding reference signaling for uplink beam tracking in accordance with various examples discussed herein. Referring to FIG. 2, at operation 210 a UE transmits is SRS capabilities to the eNB including a number, x, of supported periodic SRS processes, and a number, y, of SRS instances in each periodic and aperiodic SRS process. At operation 215 the eNB configures a number, x, periodic SRS processes for the UE. At operation 220 the UE transmits the number, x, periodic SRS processes, each of which may be transmitted in a different beam sector. At operation 225 at least one mmWave AP generates a measurement report of the received periodic SRS processes. The report may be transmitted to the eNB.

At operation 230 the eNB stores and tracks the received power and/or received quality of each detected SRS process from the UE. At operation 235 the UE transmits an uplink data packet scheduling request to the eNB.

Operations 240-255 are optional. At operation 240 the eNB triggers an aperiodic SRS corresponding to the strongest beam sector, which consists of y SRS instances in y SRS TTIs. At operation 245 the UE Transmit y SRS instances, each of which is transmitted in a separate beam direction within the strongest beam sector. At operation 250 the mmWave AP transmits a measurement report of received aperiodic SRS processes to the eNB. At operation 255 the eNB ranks the receive power/quality of the y SRS instances from the aperiodic SRS, and determines the strongest uplink beam direction according to the strongest receive SRS instance.

At operation 260 the eNB schedules the uplink data packet, with the preferred uplink beam direction defined by the index of strongest receive SRS process (and instance). At operation 265 the UE Transmit uplink data packet (embedded with requested aperiodic SRS) with the beam direction signaled from operation 255.

Figure 3:
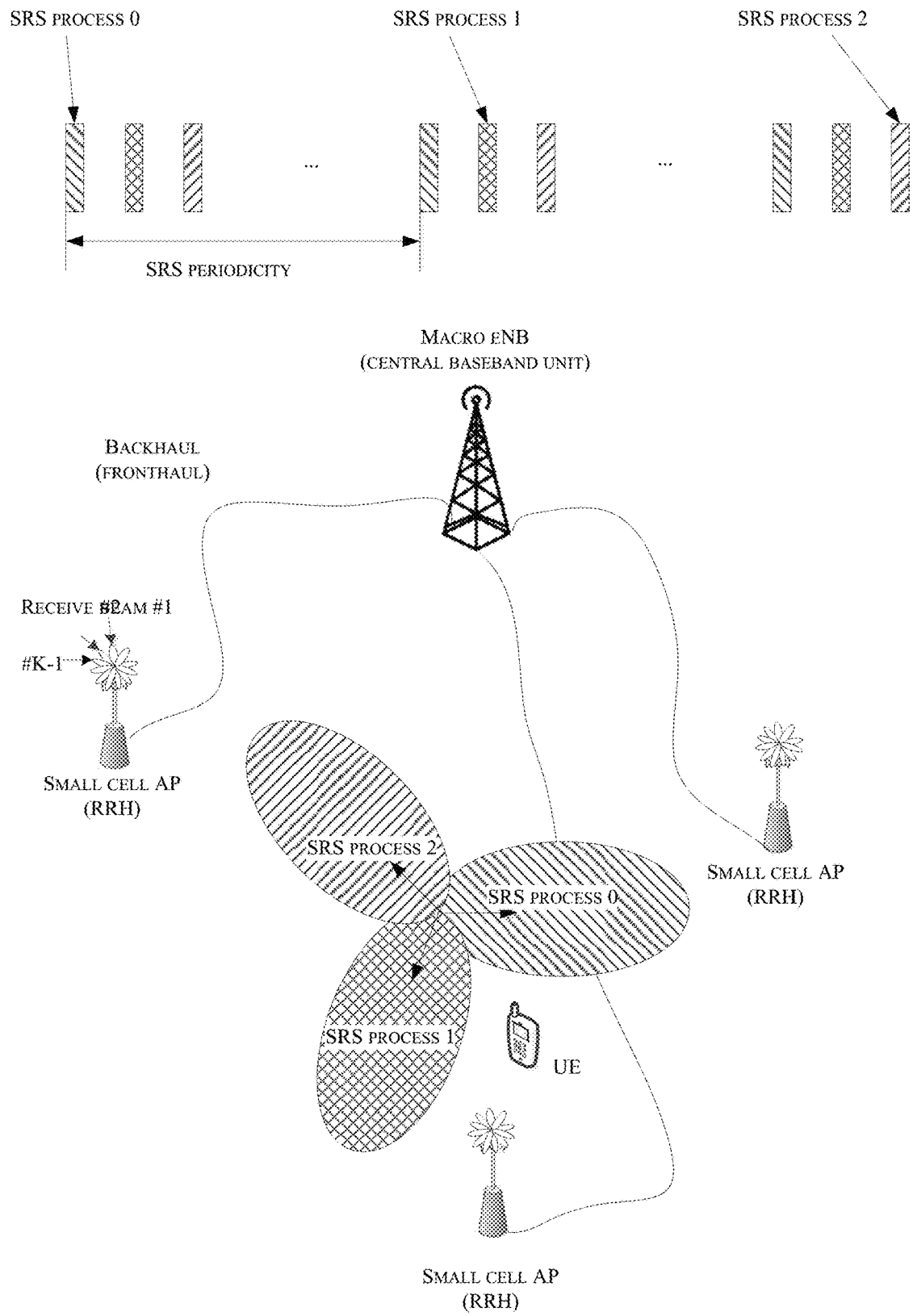
FIG. 3 is a schematic illustration of a network architecture to implement enhanced sounding reference signaling for uplink beam tracking in accordance with various examples discussed herein.

FIG. 3 is a schematic illustration of a network architecture enhanced sounding reference signaling for uplink beam tracking in accordance with various examples discussed herein. As shown in operation 210 of FIG. 2, after establishing the RRC connection to the network/eNB, (the macro eNB in FIG. 3), the UE signals its uplink beamforming capability to the network. Based on the UE signaling, the eNB configures three periodic SRS processes to the UE in the operation 215 of FIG. 2. For example, the three configured SRS processes are shown in FIG. 3, and only one SRS instance is configured in each SRS process.

In operation 220, the UE starts to transmit the three configured periodic SRS processes, each of which corresponds to a beam sector of 120°. All the mmWave APs in FIG. 3 measure and track the receive power or receive quality of each detected SRS process from the UE. Assuming that the preceding measurements from all the APs are communicated to eNB in operation 225, the eNB has the knowledge about which SRS process has the strongest receive power/quality. When there is an uplink data packet to be transmitted in the UE buffer, the UE will send a scheduling request to the eNB. Then the eNB can optionally trigger an aperiodic SRS transmission from the UE, which corresponds to the periodic SRS process associated with the strongest beam sector.

Figure 4:
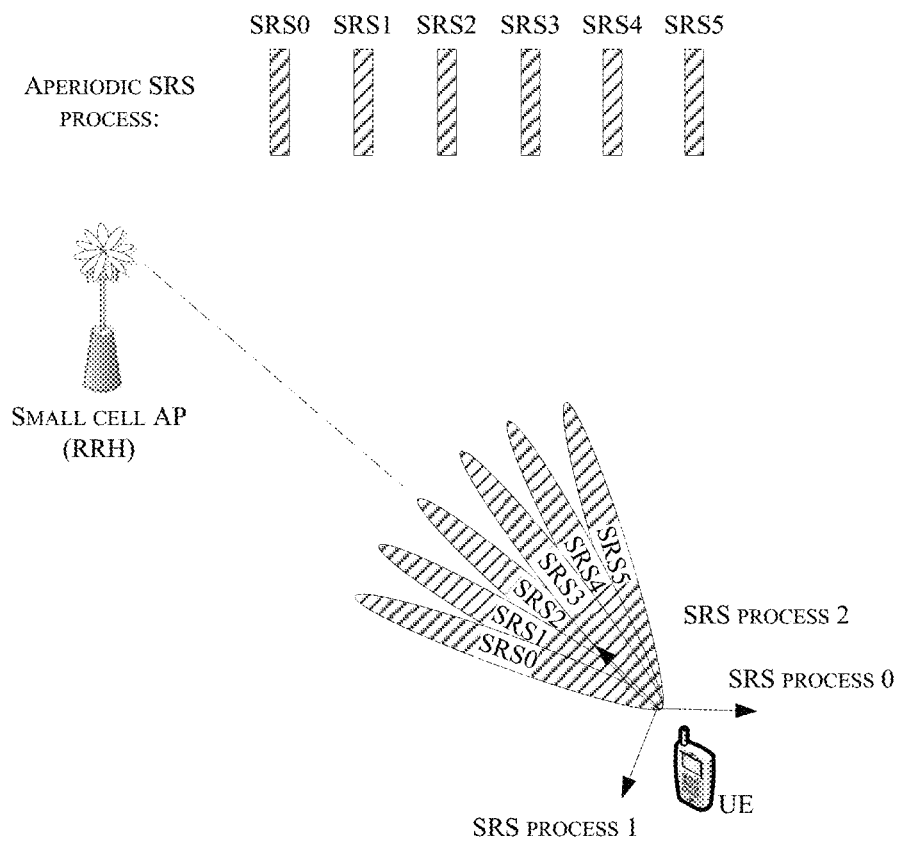
FIG. 4 is a diagram illustrating techniques for enhanced sounding reference signaling for uplink beam tracking in accordance with various examples discussed herein.

FIG. 4 is a diagram illustrating techniques for enhanced sounding reference signaling for uplink beam tracking in accordance with various examples discussed herein. Referring to FIG. 4, the aperiodic SRS can be dynamically triggered by the eNB. In the optional operation 245, the UE transmits 6 SRS instances in the earliest possible SRS TTIs, each of which corresponds to a different beam direction with the beam width of 20°. Based on the measurement report of the receive power/quality of the 6 SRS instances from the mmWave APs, the eNB determines the strongest SRS instance index in operation 255 of FIG. 2. In operation 260, the eNB schedules the uplink data packet with the control information which includes the preferred uplink beam direction indicated by either the periodic SRS process index or the SRS instance index in the previous triggered aperiodic SRS process. As shown in the example of FIG. 4, the eNB may signal to the UE to employ the beam direction associated with the SRS-instance-2 for the data packet transmission. After receiving the uplink data packet scheduling information, the UE transmits the data packet to the beam direction signaled in the control scheduling information in operation 265 of FIG. 2.

As mentioned above, the aperiodic SRS process can be optionally requested by the eNB. In the following four cases, the aperiodic SRS can be triggered. In a first case, after a UE is connected to the network and the network has no knowledge about the preferred UL refined beam direction, the network may request the UE to transmit an aperiodic SRS for initial beam refinement. In a second case, when the strongest received periodic SRS changes from one to the other, the network may trigger the aperiodic SRS to acquire the refined beam alignment corresponding to the new strongest periodic SRS process. In a third case, when UE is transitioned from an inactive state to an active state (e.g. UE wakes up after long DRX operation), and the refined beam direction can be obsolete, the aperiodic can be triggered. In a fourth case, when a new UL data packet is waiting for the transmission, the eNB may trigger the aperiodic SRS prior to and/or during the data transmission.

In some examples methods may be adapted to accommodate multiple point reception with UL receive beam alignment. For example, a small cell AP may be equipped with more antenna elements than the UE. In such examples the UL receive antenna/beamforming gain can be potentially greater than the UL transmit antenna/beamforming gain, and the number of simultaneously formed receive beams is likely to be larger than the number of UL transmit beams per UE. In mid-to-high frequency bands, in order to guarantee a proper uplink coverage, a random access procedure may include uplink transmit and receive beam acquisition. Once the network has acquired receive beam sets, the network may configure the UE to perform UL sounding for all the acquired UL receive beams, and may group UL Rx beams for UL sounding measurement. To obtain multiple users' transmit beams in a resource efficient manner, the network may schedule frequency-domain multiplexed multi-user UL SRSs per its Rx beam group, wherein the multiplexed users are associated with the same Rx beam or Rx beam group.

Figure 5:
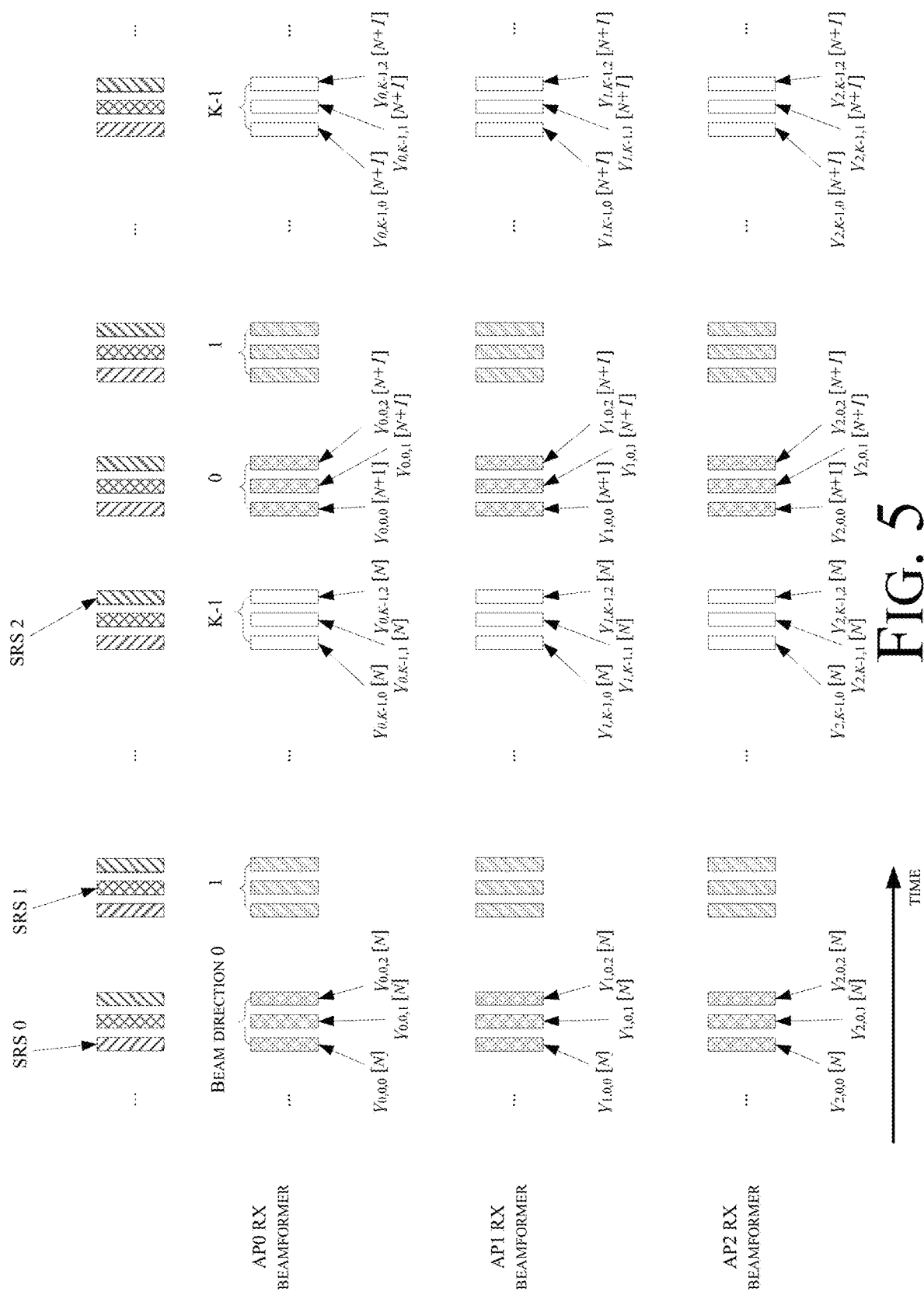
FIG. 5 is a diagram illustrating beam settings for enhanced sounding reference signaling for uplink beam tracking in accordance with various examples discussed herein.

Depending on the SRS measurement accuracy and the consequent number of SRS measurement opportunities being averaged over, the receive beamformer can be adjusted accordingly so that all possible tx-rx direction pairs are measured with sufficient accuracy. For example, the receive beamformer with K different beam directions can be adjusted cyclically as shown in FIG. 5.

Let $\theta_T$, $\theta_{R,i}$ $\theta_T$, $\theta_{R,i}$ denote the SRS index and Rx beam direction index at the $i_{th}$ AP, respectively. The measurement metric such as RSRP/RSRQ or SNR, of the SRS with the $\theta_T$ th Rx beam direction at the during the $\theta_R$ th Tx-Rx measurement pair opportunity, can be denoted as $\gamma i$, $\theta_{R,i}$, $\theta_T^{[n]}$. The average measurement metric over N consecutive measurement pairs can be calculated by a moving averaging filter as:

$$\overline{\gamma}_i, \theta_{R,i}, \theta_T = \frac{1}{N} \sum_{k=0}^{k=N-1} \gamma_i, \theta_{R,i}, \theta_T^{[n-k]} \qquad \text{EQ 1}$$

The average measurements may be performed by all the APs in the CoMP receive set A. With these measurements, different types of CoMP reception schemes such as joint reception, dynamic point selection or combination thereof, can be readily supported.

For example, the dynamic point selection based CoMP receive scheme can be implemented as Eq. (2).

$$\{i^*[n], \theta_{R,i^*[n]}^*[n], \theta_T^*[n]\} = \arg \max_{i \in A, \theta_{R,i}, \theta_{T,}} \overline{\gamma}_{i,\theta_{R,i},\theta_T}[n] \qquad \text{EQ2}$$

where $i^*[n]$ denotes the selected receive AP, $\theta_{R,i^*[n]}^*[n]$ stands for the optimal receive beam direction/index of the selected receive AP, and $\theta_T^*[n]$ defines the optimal transmit beam direction/index of the UE.

The joint reception scheme can be implemented as Eq. (3).

$$\{\theta_{R,i}^*[n], \theta_T^*[n]\} = \arg\max_{\theta_T} \left( \Sigma_{i \in A} \max_{\theta_{R,i}} \bar{\gamma}_{t,\theta_{R,i},\theta_T}[n] \right) \quad \text{EQ 3}$$

If the UE is equipped with several RF chains, and thus capable of transmitting multiple beams simultaneously, the above CoMP schemes can be easily extended to support UL multiple beam transmission. For example, rather than selecting single optimal transmit beam direction $\theta_T^*[n]$, the eNB scheduler shall select a set of optimal transmit beams to maximize the target optimization function.

Figure 6:
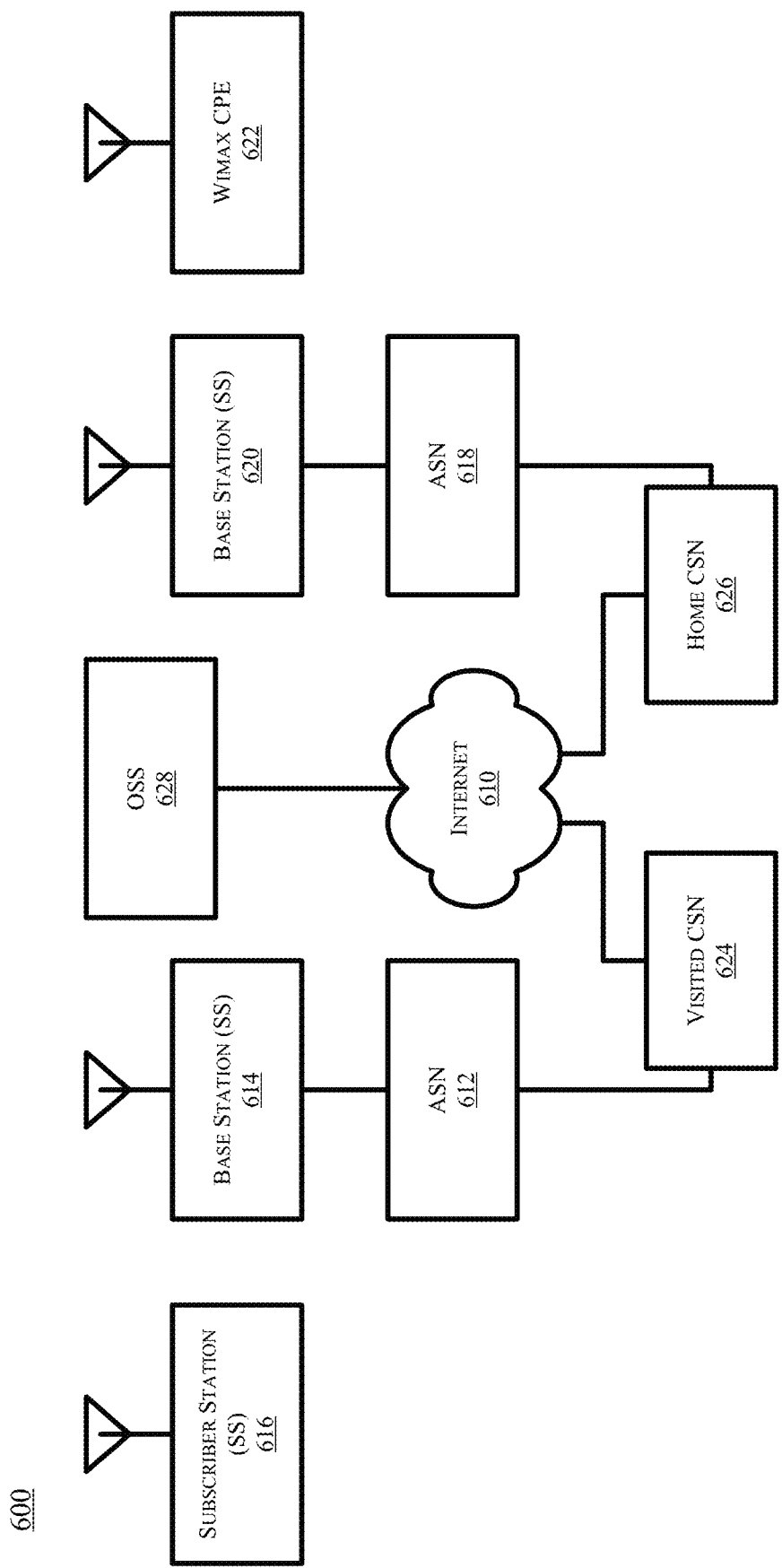
FIG. 6 is a schematic, block diagram illustration of a wireless network in accordance with one or more exemplary embodiments disclosed herein.

FIG. 6 is a schematic, block diagram illustration of a wireless network 600 in accordance with one or more exemplary embodiments disclosed herein. One or more of the elements of wireless network 600 may be capable of implementing methods to identify victims and aggressors according to the subject matter disclosed herein. As shown in FIG. 6, network 600 may be an Internet-Protocol-type (IP-type) network comprising an Internet-type network 610, or the like, that is capable of supporting mobile wireless access and/or fixed wireless access to Internet 610.

In one or more examples, network 600 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 600 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 612 is capable of coupling with base station (BS) 614 to provide wireless communication between subscriber station (SS) 616 (also referred to herein as a wireless terminal) and Internet 610. In one example, subscriber station 616 may comprise a mobile-type device or information-handling system capable of wirelessly communicating via network 600, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 612 may implement profiles that are capable of defining the mapping of network functions to one or more physical entities on network 600. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to Internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects.

Visited CSN 624 may be referred to as a visited CSN in the case, for example, in which visited CSN 624 is not part of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616.

In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614, ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example.

It should be noted that CPE 622 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 622 is capable of providing an uplink-transmit-power control technique that reduces interference experienced at other wireless devices according to the subject matter disclosed herein.

In accordance with one or more examples, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

Figure 7:
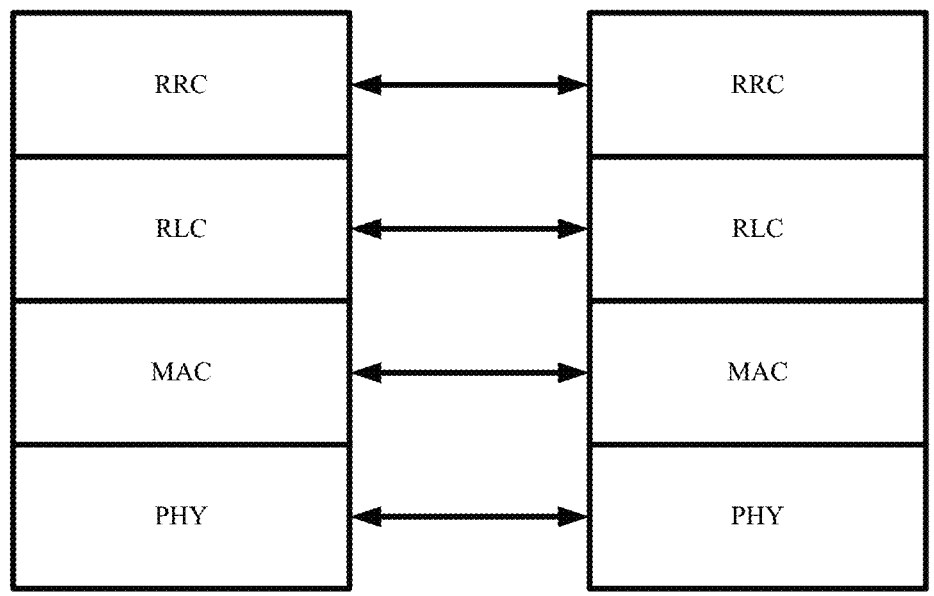
FIGS. 7 and 8 are schematic, block diagram illustrations, respectively, of radio interface protocol structures between a UE and an eNodeB based on a 3GPP-type radio access network standard in accordance with one or more exemplary embodiments disclosed herein.
Figure 8:
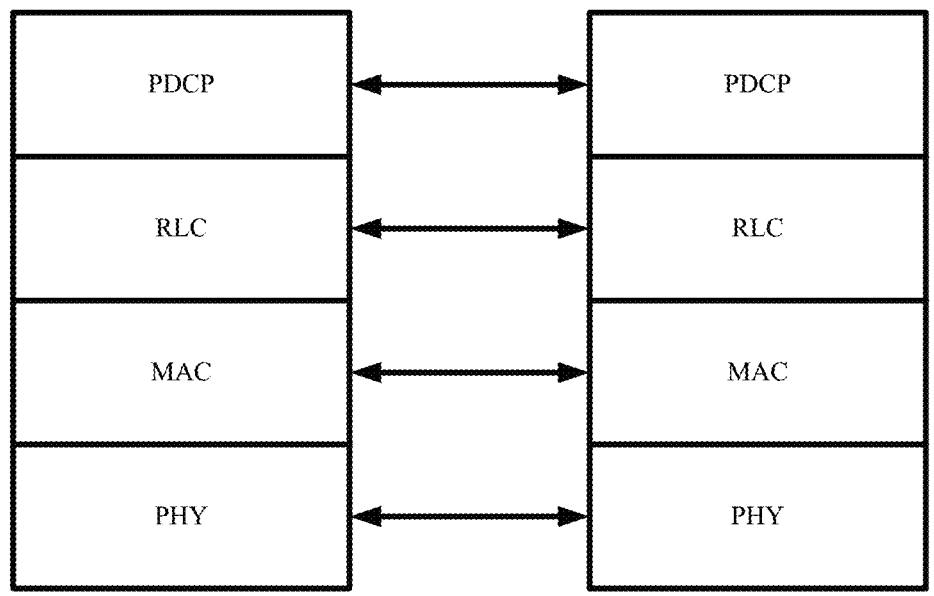

FIGS. 7 and 8 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 7 depicts individual layers of a radio protocol control plane and FIG. 8 depicts individual layers of a radio protocol user plane. The protocol layers of FIGS. 7 and 8 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information used for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 9:
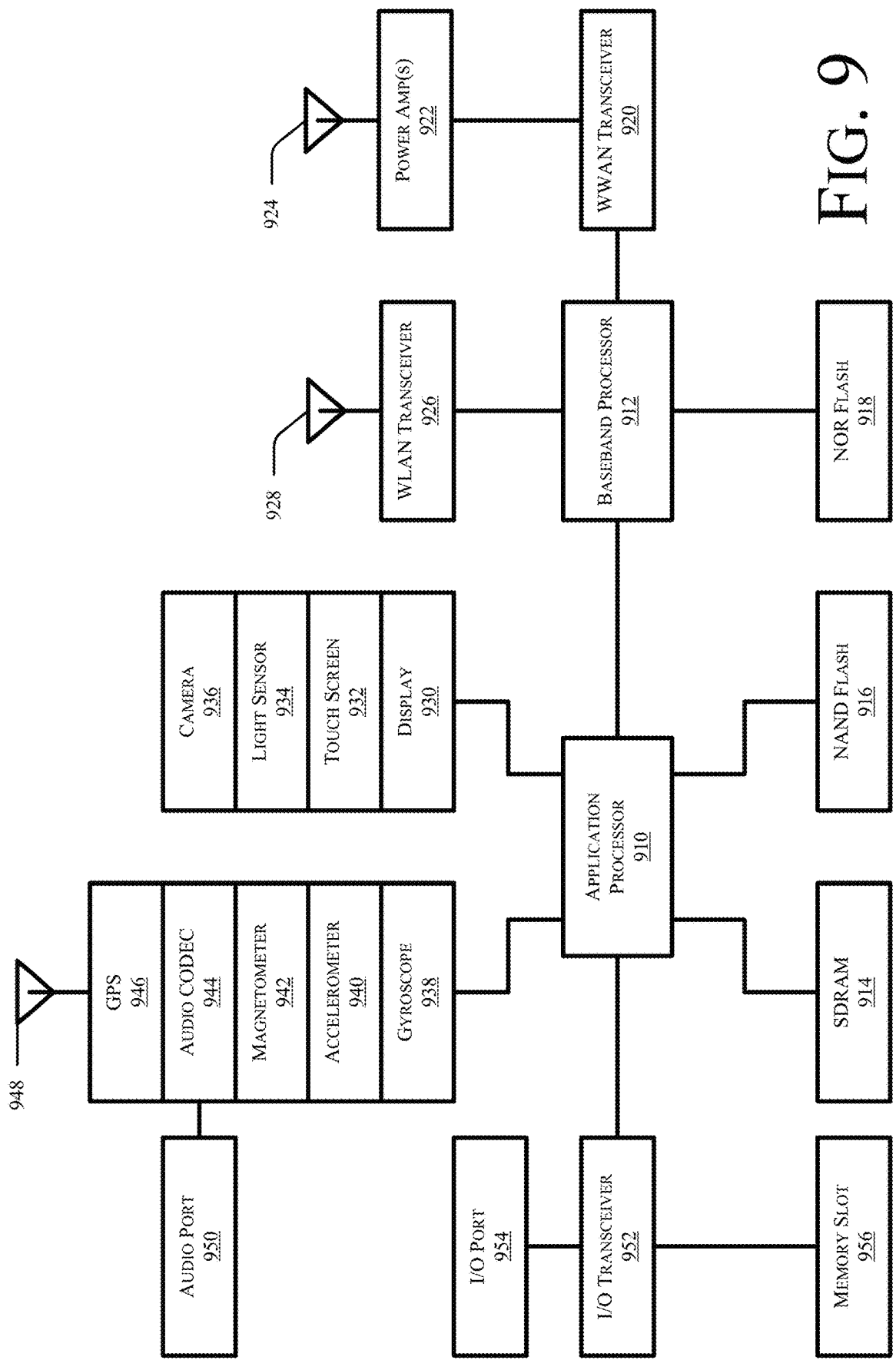
FIG. 9 is a schematic, block diagram illustration of an information-handling system in accordance with one or more exemplary embodiments disclosed herein.

FIG. 9 depicts an exemplary functional block diagram of an information-handling system 900 that is capable of implementing methods to identify victims and aggressors according to the subject matter disclosed herein. Information handling system 900 of FIG. 9 may tangibly embody one or more of any of the exemplary devices, exemplary network elements and/or functional entities of the network as shown in and described herein. In one example, information-handling system 900 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 900 is capable of providing an uplink-transmit-power control technique that reduces interference experienced at other wireless devices according to the subject matter disclosed herein. Although information-handling system 900 represents one example of several types of computing platforms, information-handling system 900 may include more or fewer elements and/or different arrangements of elements than shown in FIG. 9, and the scope of the claimed subject matter is not limited in these respects.

In one or more examples, information-handling system 900 may comprise one or more applications processor 910 and a baseband processor 912. Applications processor 910 may be utilized as a general purpose processor to run applications and the various subsystems for information handling system 900, and to capable of providing an uplink-transmit-power control technique that reduces interference experienced at other wireless devices according to the subject matter disclosed herein. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on-board memory, such as cache memory, and further may be coupled to external memory devices such as synchronous dynamic random access memory (SDRAM) 914 for storing and/or executing applications, such as capable of providing an uplink-transmit-power control technique that reduces interference experienced at other wireless devices according to the subject matter disclosed herein. During operation, and NAND flash 916 for storing applications and/or data even when information handling system 900 is powered off. In one example, a list of candidate nodes may be stored in SDRAM 914 and/or NAND flash 916. Further, applications processor 910 may execute computer-readable instructions stored in SDRAM 914 and/or NAND flash 916 that result in an uplink-transmit-power control technique that reduces interference experienced at other wireless devices according to the subject matter disclosed herein.

In one example, baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example, for communicating via a 3GPP LTE network or the like as discussed herein with respect to FIG. 9. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 910 may drive a display 930 for displaying various information or data, and may further receive touch input from a user via a touch screen 932, for example, via a finger or a stylus. In one exemplary embodiment, screen 932 display a menu and/or options to a user that are selectable via a finger and/or a stylus for entering information into information-handling system 900.

An ambient light sensor 934 may be utilized to detect an amount of ambient light in which information-handling system 900 is operating, for example, to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may be coupled to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information-handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example, via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

Figure 10:
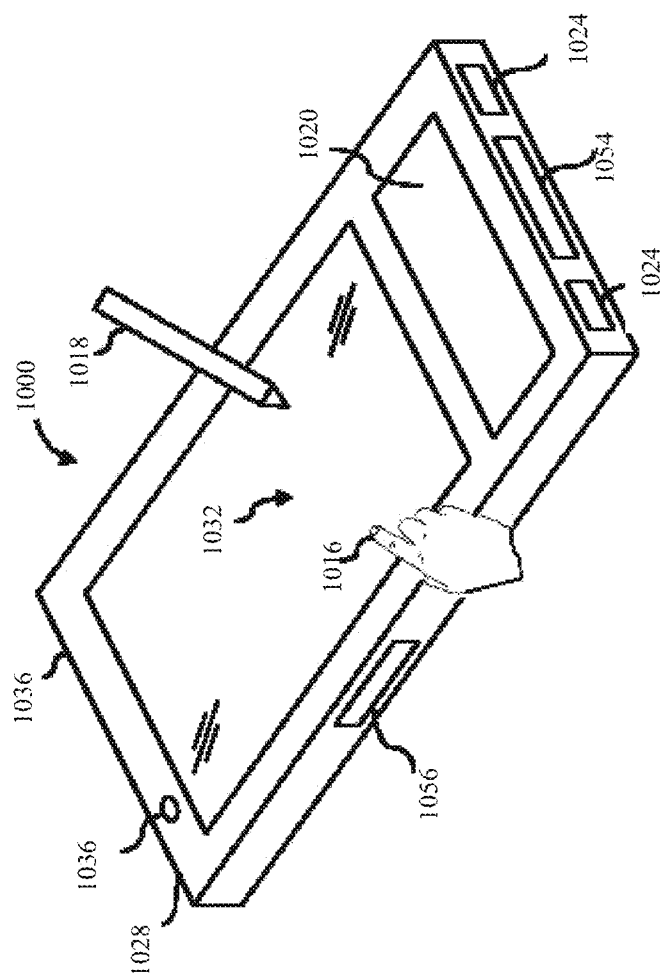
FIG. 10 is an isometric view of an exemplary embodiment of the information-handling system of FIG. 10 that optionally may include a touch screen in accordance with one or more embodiments disclosed herein.
Figure 11:
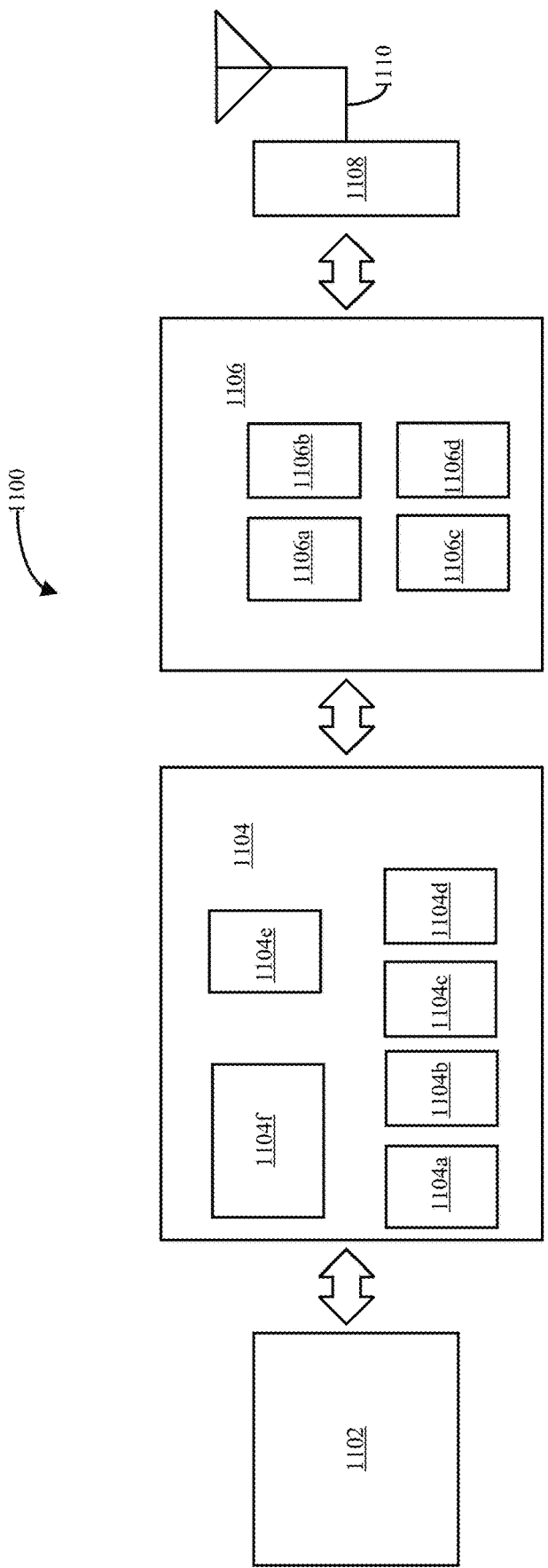
FIG. 11 is a schematic, block diagram illustration of components of a wireless device in accordance with one or more exemplary embodiments disclosed herein.

FIG. 10 depicts an isometric view of an exemplary embodiment of the information-handling system of FIG. 9 that optionally may include a touch screen in accordance with one or more embodiments disclosed herein. FIG. 11 shows an example implementation of an information-handling system 1000 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1010 having a display 1030 that may include a touch screen 1032 for receiving tactile input control and commands via a finger 1016 of a user and/or a via stylus 1018 to control one or more applications processors 910. The housing 1010 may house one or more components of information-handling system 1000, for example, one or more applications processors 910, one or more of SDRAM 914, NAND flash 916, NOR flash 918, baseband processor 912, and/or WWAN transceiver 920. The information-handling system 1000 further may optionally include a physical actuator area 1020 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1024 and a connection port 1054 for connecting the information-handling system 1000 to another electronic device, dock, display, battery charger, and so on.

Additionally, information-handling system 1000 may include a headphone or speaker jack 1028 and one or more cameras 1036 on one or more sides of the housing 1010. It should be noted that the information-handling system 1000 of FIG. 10 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 11 illustrates, for one embodiment, example components of a User Equipment (UE) device 1100. In some embodiments, the UE device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104f. The audio DSP(s) 1104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the embodiments is not limited in this respect.

In some embodiments, the mixer circuitry 1106a of the receive signal path and the mixer circuitry 1106a of the transmit signal path may include two or more mixers and may be arranged for quadrature downconversion and/or upconversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and/or direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the UE device 1100 may include additional elements such as, for example, memory/storage, display, camera, sensor, and/or input/output (I/O) interface.

The following pertains to further examples.

Example 1 is an apparatus of an evolved Node B (eNB) comprising circuitry to broadcast system information about one or more sets of uplink transmit time intervals and bandwidths available for a sounding reference signal (SRS) transmission from a first user equipment (UE), configure one or more UE-specific SRS processes for the first UE for uplink beam tracking, and configure one or more millimeter wave access points (mmW APs) to transmit a mmW signal to the first UE and receive a mmW signal from the first UE.

In Example 2, the subject matter of Example 1 can optionally include circuitry to receive a list of SRS capabilities from the first UE.

In Example 3, the subject matter of any one of Examples 1-2 can optionally include an arrangement in which the list of SRS capabilities comprises at least one of a number of supported periodic SRS processes, a number of antenna ports in each supported periodic SRS process, a number of supported SRS instances in an aperiodic SRS process which corresponds to a periodic SRS process, or a number of antenna ports supported in an aperiodic SRS process.

In Example 4, the subject matter of any one of Examples 1-3 can optionally include circuitry to generate a configuration signaling to configure at least one periodic SRS process for the first UE.

In Example 5, the subject matter of any one of Examples 1-4 can optionally include an arrangement in which the configuration signaling comprises at least one of a periodicity of the SRS process, a TTI offset in a frame of the SRS process, a sounding bandwidth of the SRS process, a frequency location of the SRS process, or a number of antenna ports of the SRS process.

In Example 6, the subject matter of any one of Examples 1-5 can optionally include circuitry to transmit a request to a mmW AP to receive the periodic SRS processes from the first UE, detect the configured SRS processes; measure at least one of the receive power or quality of the detected SRS processes, and report the at least one of the receive power or quality of the detected SRS processes to the eNB, and determine a strongest received SRS process based on the at least one of the receive power or quality of the detected SRS processes.

In Example 7, the subject matter of any one of Examples 1-6 can optionally include circuitry to receive an uplink data scheduling request from the first UE, and in response thereto, to trigger an aperiodic SRS process for the first UE.

In Example 8, the subject matter of any one of Examples 1-7 can optionally include an arrangement in which the aperiodic SRS process for the first UE is triggered by a dynamic control signaling which includes at least one of a periodic SRS process index which is quasi-collocated with the configured aperiodic SRS process or a number of SRS instances in the aperiodic SRS process.

In Example 9, the subject matter of any one of Examples 1-8 can optionally include circuitry to transmit a request to a mmW AP to receive the aperiodic SRS processes from the first UE, detect one or more SRS instances of the aperiodic SRS processes, measure at least one of the receive power or quality of the detected SRS instances, and report the at least one of the receive power or quality of the detected SRS processes to the eNB. and determine a strongest received SRS process based on the at least one of the receive power or quality of the detected SRS processes and schedule an uplink data packet by a dynamic control signaling.

In Example 10, the subject matter of any one of Examples 1-9 can optionally include an arrangement wherein the dynamic control signaling comprises at least one of an uplink frequency resource, a modulation coding scheme (MCS), a transport block size, or a preferred uplink transmit direction indicated by a strongest receive SRS instance in the configured aperiodic SRS process.

Example 11 is an apparatus of a user equipment (UE) comprising circuitry to establish a communication connection with an evolved Node B (eNB), receive, from the eNB, a request to configure one or more UE-specific SRS processes for the UE for uplink beam tracking, and transmit to the eNB a list of SRS capabilities for the UE.

In Example 12, the subject matter of Example 11 can optionally include circuitry to receive, from the eNB a configuration signaling to configure at least one periodic SRS process for the UE, wherein the configuration signaling comprises at least one of a periodicity of the SRS process, a TTI offset in a frame of the SRS process, a sounding bandwidth of the SRS process, a frequency location of the SRS process, or a number of antenna ports of the SRS process.

In Example 13, the subject matter of any one of Examples 11-12 can optionally include an arrangement in which the list of SRS capabilities comprises at least one of a number of supported periodic SRS processes, a number of antenna ports in each supported periodic SRS process, a number of supported SRS instances in an aperiodic SRS process which corresponds to a periodic SRS process, or a number of antenna ports supported in an aperiodic SRS process.

In Example 14, the subject matter of any one of Examples 11-13 can optionally include circuitry to transmit a plurality of periodic SRS processes in different beam sectors.

In Example 15, the subject matter of any one of Examples 11-14 can optionally include circuitry to receive a data packet in a traffic buffer queue, and in response thereto, to transmit an uplink scheduling request to the eNB when a data packet arrives to the UE traffic buffer queue.

In Example 16, the subject matter of any one of Examples 11-14 can optionally include circuitry to receive an aperiodic SRS process configuration from the eNB, and in response thereto, to transmit a plurality of SRS instances configured in the aperiodic SRS process in a plurality of different beam sectors.

In Example 17, the subject matter of any one of Examples 11-16 can optionally include an arrangement wherein with a beam sector associated with an SRS instance is indicated by an associated periodic SRS process index.

In Example 18, the subject matter of any one of Examples 11-17 can optionally include circuitry to receive, from the eNB, uplink data scheduling information, decode the uplink data scheduling information, and transmit an uplink data packet using the uplink data scheduling information.

In Example 19, the subject matter of any one of Examples 11-18 can optionally include an arrangement wherein the data scheduling information comprises at least one of an uplink frequency resource, a modulation coding scheme (MCS), a transport block size, or a preferred uplink transmit direction indicated by a strongest receive SRS instance in the configured aperiodic SRS process.

In Example 20, the subject matter of any one of Examples 11-19 can optionally include circuitry to transmit the uplink data packet using the decoded MCS and frequency resources in the preferred uplink beam direction.

Example 21 is a machine-readable medium comprising instructions which, when executed by a processor in an apparatus of an evolved Node B (eNB), configure the processor to broadcast system information about one or more sets of uplink transmit time intervals and bandwidths available for a sounding reference signal (SRS) transmission from a first user equipment (UE), configure one or more UE-specific SRS processes for the first UE for uplink beam tracking, and configure one or more millimeter wave access points (mmW APs) to transmit a mmW signal to the first UE and receive a mmW signal from the first UE.

In Example 22, the subject matter of Example 21 can optionally include instructions which, when executed by the processor, configure the processor to to receive a list of SRS capabilities from the first UE.

In Example 23, the subject matter of any one of Examples 21-22 can optionally include an arrangement wherein the list of SRS capabilities comprises at least one of a number of supported periodic SRS processes, a number of antenna ports in each supported periodic SRS process, a number of supported SRS instances in an aperiodic SRS process which corresponds to a periodic SRS process, or a number of antenna ports supported in an aperiodic SRS process.

In Example 24, the subject matter of any one of Examples 21-23 can optionally include instructions which, when executed by the processor, configure the processor to generate a configuration signaling to configure at least one periodic SRS process for the first UE.

In Example 25 the subject matter of any one of Examples 21-24 can optionally include an arrangement wherein the configuration signaling comprises at least one of a periodicity of the SRS process, a TTI offset in a frame of the SRS process, a sounding bandwidth of the SRS process, a frequency location of the SRS process, or a number of antenna ports of the SRS process.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of an evolved Node B (eNB) comprising circuitry to:
   receive broadcast system information about one or more sets of uplink transmit time intervals and bandwidths available for a plurality of sounding reference signal (SRS) transmission signals from a first user equipment (UE), wherein each of the plurality of SRS transmission signals is transmitted in a different beam sector;
   receive, from at least one millimeter wave access point (mmW AP), a measurement report associated with the plurality of SRS transmission signals received by the mmW AP;
   receive, from the first UE, an uplink data packet scheduling request
   configure a plurality of UE-specific SRS processes in a plurality of uplink beams for the first UE for uplink beam tracking based at least in part on the measurement report associated with the plurality of SRS transmission signals;
   generate a ranking of at least one of a received power measurement or a received quality measurement of each SRS process of the plurality of UE-specific SRS processes;
   schedule an uplink data packet on an uplink beam based at least in part on the ranking; and
   configure one or more millimeter wave access points (mmW APs) to transmit a mmW signal to the first UE and receive a mmW signal from the first UE.

2. The apparatus of claim 1, further comprising circuitry to receive a list of SRS capabilities from the first UE.

3. The apparatus of claim 2, wherein the list of SRS capabilities comprises at least one of:
   a number of supported periodic SRS processes;
   a number of antenna ports in each supported periodic SRS process;
   a number of supported SRS instances in an aperiodic SRS process which corresponds to a periodic SRS process; or
   a number of antenna ports supported in an aperiodic SRS process.

4. The apparatus of claim 2, further comprising circuitry to:
   generate a configuration signaling to configure at least one periodic SRS process for the first UE.

5. The apparatus of claim 4, wherein the configuration signaling comprises at least one of:
   a periodicity of the SRS process;
   a TTI offset in a frame of the SRS process;
   a sounding bandwidth of the SRS process;
   a frequency location of the SRS process; or
   a number of antenna ports of the SRS process.

6. The apparatus of claim 5, further comprising circuitry to:
   transmit a request to a mmW AP to:
      receive the periodic SRS processes from the first UE;
      detect the configured SRS processes;
      measure at least one of the receive power or quality of the detected SRS processes; and
      report the at least one of the receive power or quality of the detected SRS processes to the eNB; and
   determine a strongest received SRS process based on the at least one of the receive power or quality of the detected SRS processes.

7. The apparatus of claim 6, further comprising circuitry to:
   receive an uplink data scheduling request from the first UE; and
   in response thereto, to trigger an aperiodic SRS process for the first UE.

8. The apparatus of claim 7, wherein the aperiodic SRS process for the first UE is triggered by a dynamic control signaling which includes at least one of:
   a periodic SRS process index which is quasi-collocated with the configured aperiodic SRS process; or
   a number of SRS instances in the aperiodic SRS process.

9. The apparatus of claim 7, further comprising circuitry to:
   transmit a request to a mmW AP to:
      receive the aperiodic SRS processes from the first UE;
      detect one or more SRS instances of the aperiodic SRS processes;

measure at least one of the receive power or quality of the detected SRS instances; and report the at least one of the receive power or quality of the detected SRS processes to the eNB; and determine a strongest received SRS process based on the at least one of the receive power or quality of the detected SRS processes; and schedule an uplink data packet by a dynamic control signaling.

10. The apparatus of claim 9, wherein the dynamic control signaling comprises at least one of:
an uplink frequency resource;
a modulation coding scheme (MCS);
a transport block size; or
a preferred uplink transmit direction indicated by a strongest receive SRS instance in the configured aperiodic SRS process.

11. An apparatus of a user equipment (UE) comprising circuitry to:
establish a communication connection with an evolved Node B (eNB);
transmit broadcast system information about one or more sets of uplink transmit time intervals and bandwidths available for a plurality of sounding reference signal (SRS) transmission signals from the UE, wherein each of the plurality of SRS transmission signals is transmitted in a different beam sector;
transmit an uplink data packet scheduling request
receive, from the eNB, a request to configure a plurality of UE-specific SRS processes in a plurality of uplink beams for the UE for uplink beam tracking based at least in part on a measurement report associated with the plurality of UE-specific SRS processes;
receive, from the eNB, a schedule for an uplink data packet on an uplink beam based at least in part on a ranking of at least one of a received power measurement or a received quality measurement of each SRS process of the plurality of UE-specific SRS processes; and
transmit to the eNB a list of SRS capabilities for the UE.

12. The apparatus of claim 11, further comprising circuitry to:
receive, from the eNB a configuration signaling to configure at least one periodic SRS process for the UE, wherein the configuration signaling comprises at least one of:
a periodicity of the SRS process;
a TTI offset in a frame of the SRS process;
a sounding bandwidth of the SRS process;
a frequency location of the SRS process; or
a number of antenna ports of the SRS process.

13. The apparatus of claim 11, wherein the list of SRS capabilities comprises at least one of:
a number of supported periodic SRS processes;
a number of antenna ports in each supported periodic SRS process;
a number of supported SRS instances in an aperiodic SRS process which corresponds to a periodic SRS process; or
a number of antenna ports supported in an aperiodic SRS process.

14. The apparatus of claim 11, further comprising circuitry to:
transmit a plurality of periodic SRS processes in different beam sectors.

15. The apparatus of claim 14, further comprising circuitry to:

receive a data packet in a traffic buffer queue, and in response thereto, to transmit an uplink scheduling request to the eNB when a data packet arrives to the UE traffic buffer queue.

16. The apparatus of claim 15, further comprising circuitry to:
receive an aperiodic SRS process configuration from the eNB, and in response thereto, to transmit a plurality of SRS instances configured in the aperiodic SRS process in a plurality of different beam sectors.

17. The apparatus of claim 16, wherein with a beam sector associated with an SRS instance is indicated by an associated periodic SRS process index.

18. The apparatus of claim 11, further comprising circuitry to:
receive, from the eNB, uplink data scheduling information;
decode the uplink data scheduling information; and
transmit an uplink data packet using the uplink data scheduling information.

19. The apparatus of claim 18, wherein the data scheduling information comprises at least one of:
an uplink frequency resource;
a modulation coding scheme (MCS);
a transport block size; or
a preferred uplink transmit direction indicated by a strongest receive SRS instance in the configured aperiodic SRS process.

20. The apparatus of claim 19, further comprising processing circuitry to transmit the uplink data packet using the decoded MCS and frequency resources in the preferred uplink beam direction.

21. A non-transitory machine-readable medium comprising instructions which, when executed by a processor in an apparatus of an evolved Node B (eNB), configure the processor to:
receive broadcast system information about one or more sets of uplink transmit time intervals and bandwidths available for a plurality of sounding reference signal (SRS) transmission signals from a first user equipment (UE), wherein each of the plurality of SRS transmission signals is transmitted in a different beam sector;
receive, from at least one millimeter wave access point (mmW AP), a measurement report associated with the plurality of SRS transmission signals received by the mmW AP;
receive, from the first UE, an uplink data packet scheduling request;
configure a plurality of UE-specific SRS processes in a plurality of uplink beams for the first UE for uplink beam tracking based at least in part on the measurement report associated with the plurality of SRS transmission signals;
generate a ranking of at least one of a received power measurement or a received quality measurement of each SRS process of the plurality of UE-specific SRS processes;
schedule an uplink data packet on an uplink beam based at least in part on the ranking; and
configure one or more millimeter wave access points (mmW APs) to transmit a mmW signal to the first UE and receive a mmW signal from the first UE.

22. The non-transitory machine-readable medium of claim 21, further comprising instructions which, when executed by the processor, configure the processor to receive a list of SRS capabilities from the first UE.

23. The non-transitory machine-readable medium of claim 22, wherein the list of SRS capabilities comprises at least one of:
- a number of supported periodic SRS processes;
- a number of antenna ports in each supported periodic SRS process;
- a number of supported SRS instances in an aperiodic SRS process which corresponds to a periodic SRS process; or
- a number of antenna ports supported in an aperiodic SRS process.

24. The non-transitory machine-readable medium of claim 22, further comprising instructions which, when executed by the processor, configure the processor to generate a configuration signaling to configure at least one periodic SRS process for the first UE.

25. The non-transitory machine-readable medium of claim 24, wherein the configuration signaling comprises at least one of:
- a periodicity of the SRS process;
- a TTI offset in a frame of the SRS process;
- a sounding bandwidth of the SRS process;
- a frequency location of the SRS process; or
- a number of antenna ports of the SRS process.

* * * * *